(12) United States Patent
Hartmann et al.

(10) Patent No.: US 11,401,120 B2
(45) Date of Patent: Aug. 2, 2022

(54) METHOD FOR UNLOADING PACKAGES FROM A TIPPED CONTAINER ONTO A CONVEYOR BELT

(71) Applicants: Bernd Hartmann, Grafschaft-Leimersdorf (DE); Hillar Loh, Niederkassel (DE)

(72) Inventors: Bernd Hartmann, Grafschaft-Leimersdorf (DE); Hillar Loh, Niederkassel (DE)

(73) Assignee: Deutsche Post AG, Bonn (DE)

( * ) Notice: Subject to any disclaimer, the term of this patent is extended or adjusted under 35 U.S.C. 154(b) by 194 days.

(21) Appl. No.: 16/555,889

(22) Filed: Aug. 29, 2019

(65) Prior Publication Data

US 2020/0071093 A1 Mar. 5, 2020

(30) Foreign Application Priority Data

Aug. 29, 2018 (DE) ...................... 10 2018 121 083.3

(51) Int. Cl.
*B65G 59/08* (2006.01)
*B65G 15/30* (2006.01)

(52) U.S. Cl.
CPC ............. *B65G 59/08* (2013.01); *B65G 15/30* (2013.01)

(58) Field of Classification Search
CPC .. B61D 9/14; B65G 2814/0358; B65G 65/23; B65G 47/96; B65G 47/962;
(Continued)

(56) References Cited

U.S. PATENT DOCUMENTS 2,353,736 A 7/1944 Le Frank
3,381,832 A 5/1968 Vilagos et al.
(Continued)

FOREIGN PATENT DOCUMENTS

CN 201272634 Y 7/2009
CN 101659356 A 3/2010
(Continued)

OTHER PUBLICATIONS

Machine translation of EP 1147988A1 from Espacenet. (Year: 2001).*

*Primary Examiner* — Mark C Hageman
(74) *Attorney, Agent, or Firm* — Reinhart Boerner Van Deuren P.C.

(57) ABSTRACT

A method for unloading packages from a container, in particular a roller container. The method requires relatively little space, and the method involves a container guide and a conveyor belt, in which the containers are moved successively along a container path by the container guide. At least in some section or sections, the conveyor belt extends to the side of and at least substantially parallel to the container path. The containers are tipped sideways in the direction of the conveyor belt during the movement along the container guide and along the conveyor belt predetermined by the container path. The packages slide out of the tipped containers onto the conveyor belt. The conveyor belt conveys the packages that have slid out of the container onwards, and the emptied tipped containers are righted again during the movement along the container guide predetermined by the container path.

28 Claims, 16 Drawing Sheets

(58) Field of Classification Search
CPC .... B65G 47/965; B65G 47/967; B65G 47/94; B65G 47/945; B65G 47/95; B65G 59/08; B65G 15/30
See application file for complete search history.

(56) References Cited

U.S. PATENT DOCUMENTS

| | | | | |
|---|---|---|---|---|
| 6,860,377 B2 * | 3/2005 | Brixius | ................ | B65G 47/965 198/370.04 |
| 10,131,505 B2 * | 11/2018 | Lagziel | ................ | B65G 47/642 |

FOREIGN PATENT DOCUMENTS

| | | |
|---|---|---|
| CN | 206645444 U | 11/2017 |
| DE | 102 36 168 B3 | 3/2004 |
| DE | 10 2009 033 455 A1 | 9/2010 |
| DE | 10 2015 217 665 A1 | 3/2017 |
| EP | 0 806 384 A2 | 11/1997 |
| EP | 1 147 988 A1 | 10/2001 |
| GB | 191413258 A | 8/1915 |

* cited by examiner

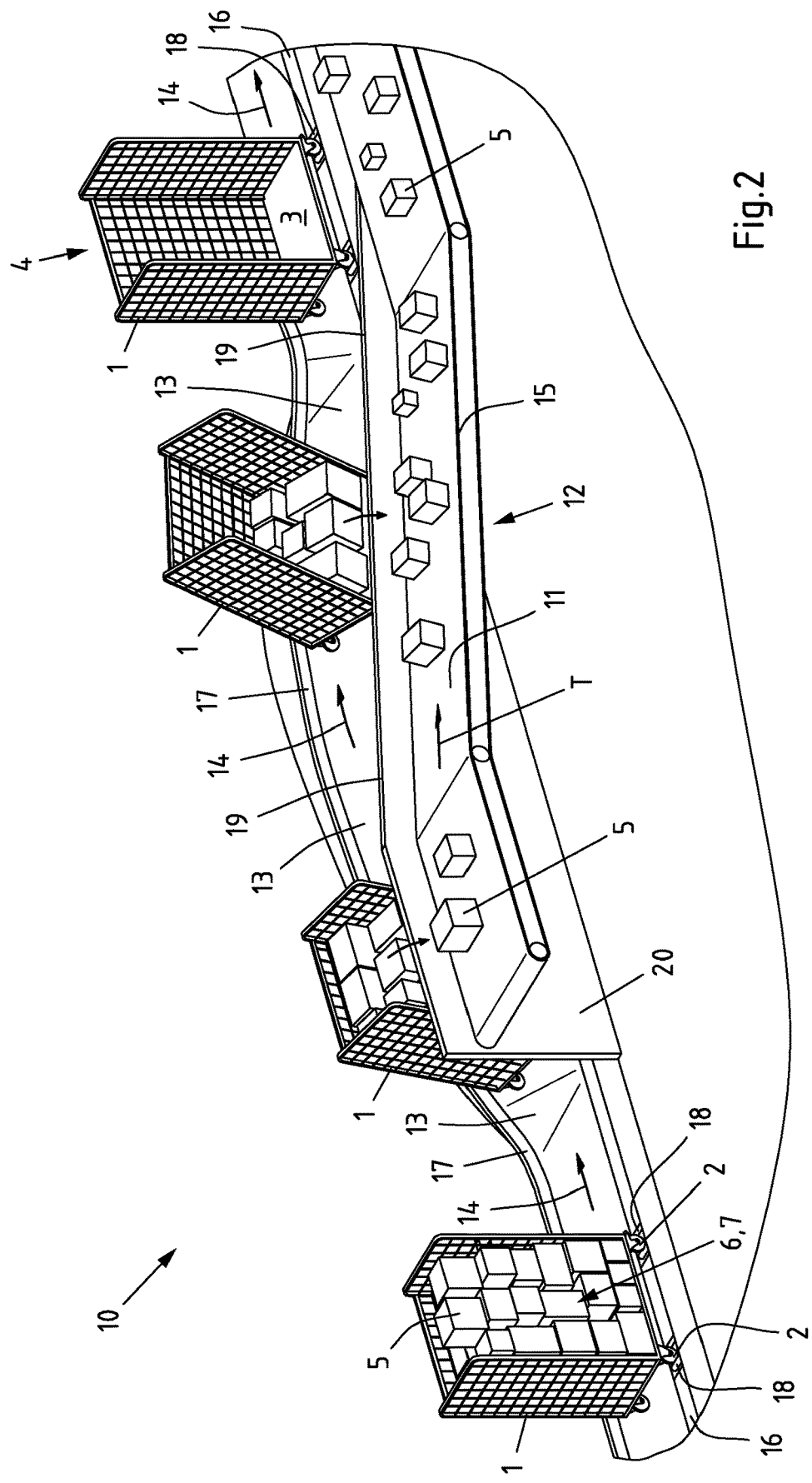

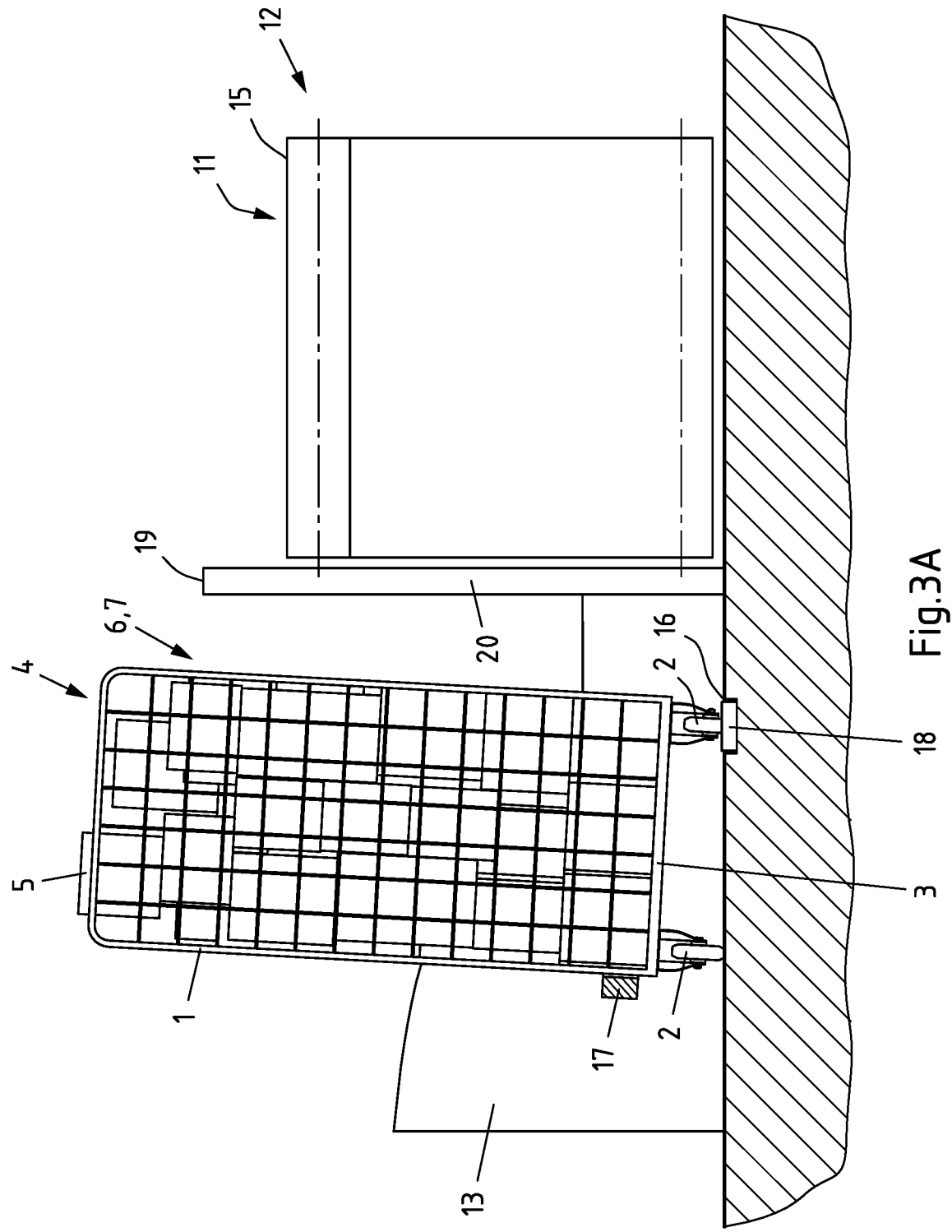

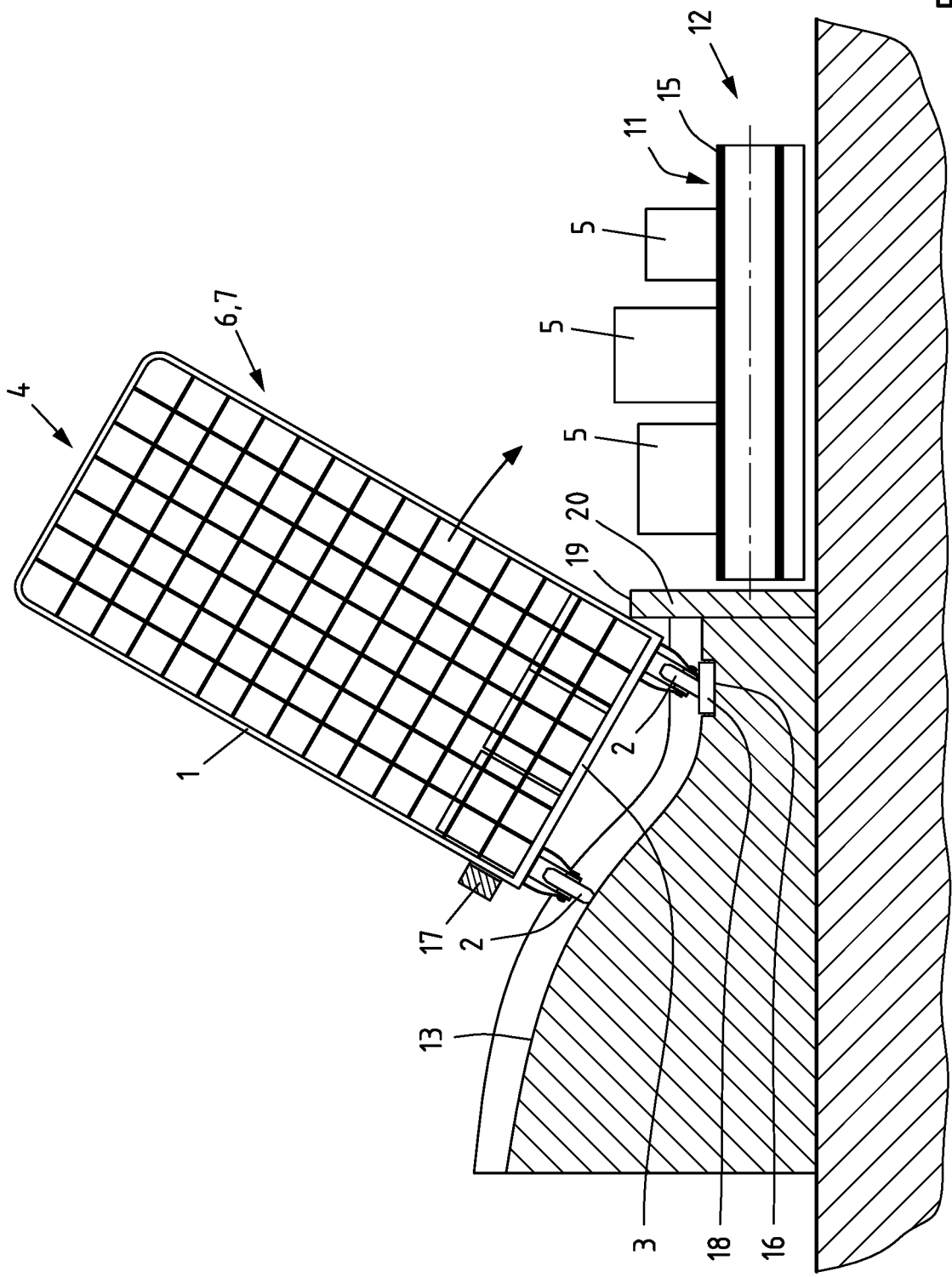

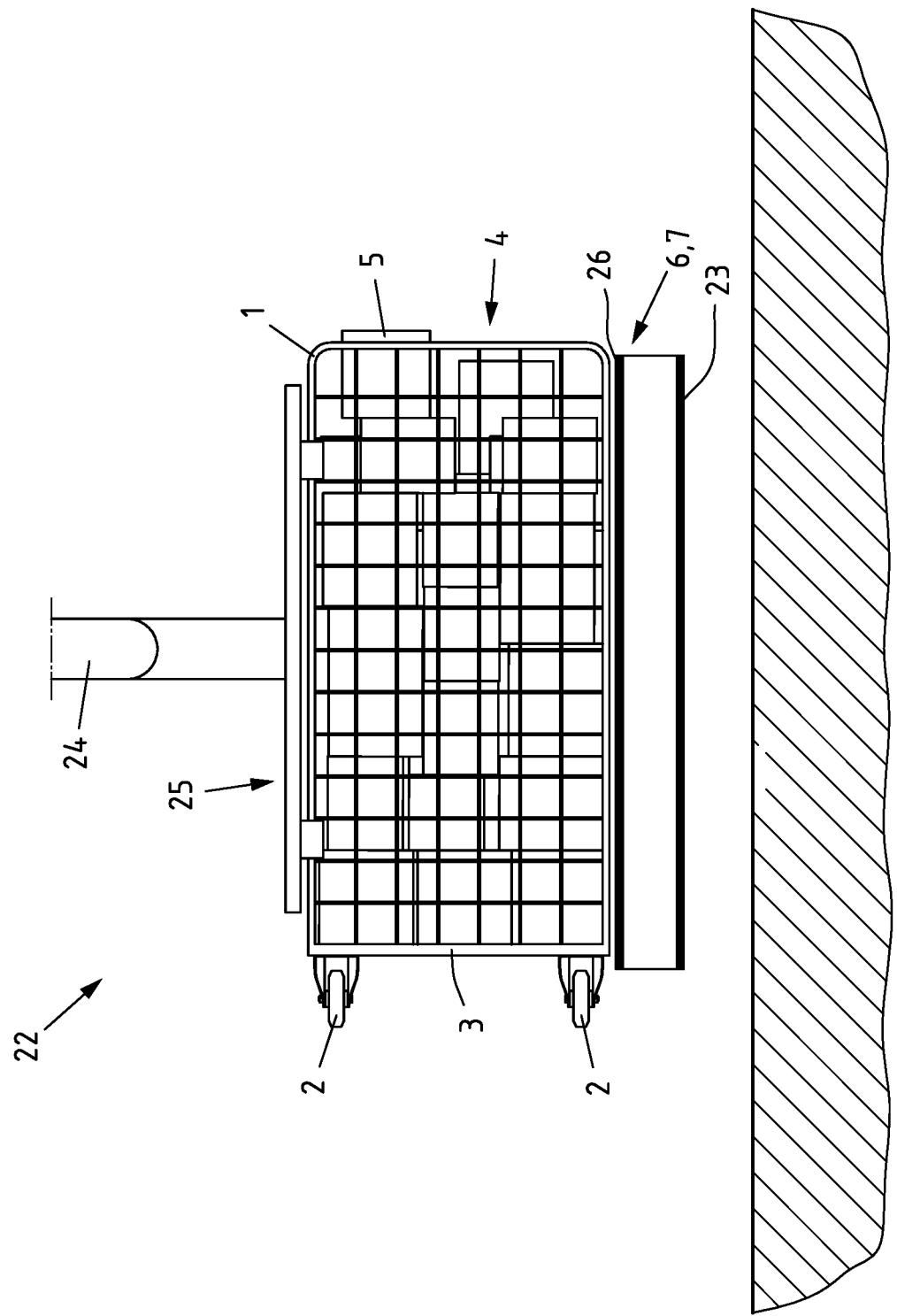

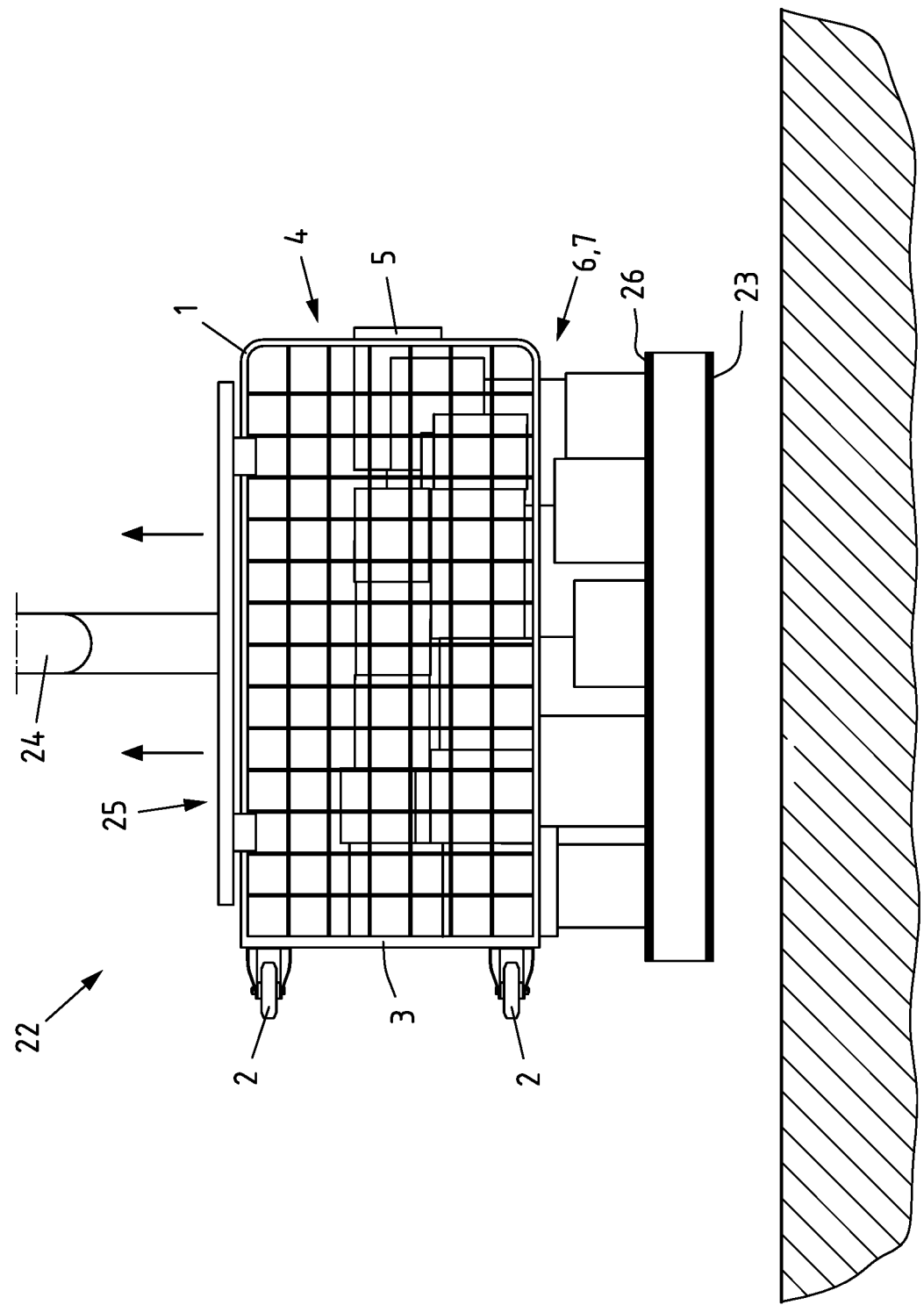

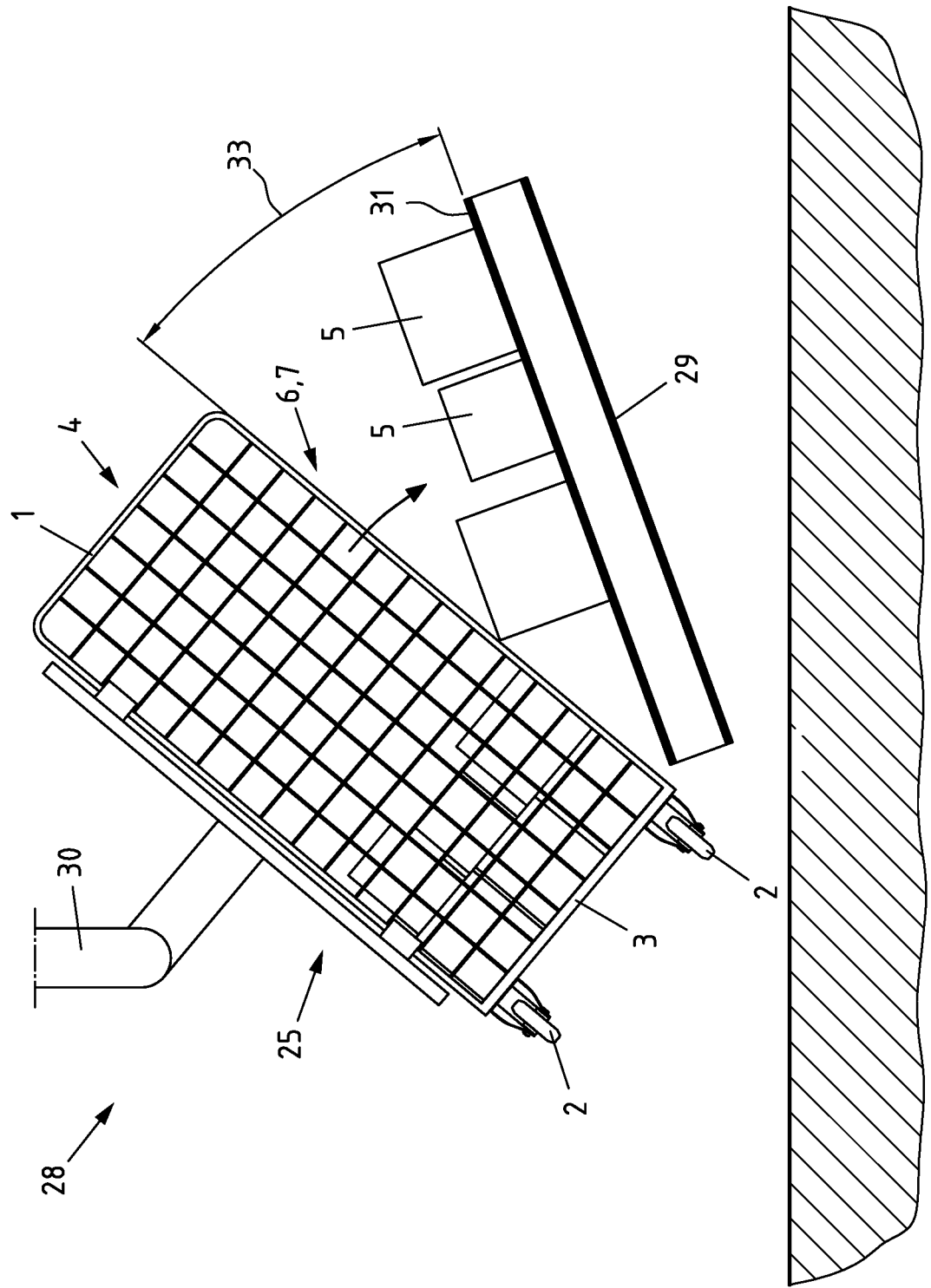

METHOD FOR UNLOADING PACKAGES FROM A TIPPED CONTAINER ONTO A CONVEYOR BELT

CROSS-REFERENCE TO RELATED PATENT APPLICATION

This patent application claims the benefit of German Patent Application No. 10 2018 121 083.3, filed Aug. 29, 2018, the entire teachings and disclosure of which are incorporated herein by reference thereto.

FIELD

The invention relates to a method for unloading packages from a container, in particular a roller container, having a container guide and a conveyor belt.

BACKGROUND

Various devices for unloading packages, i.e. unpacked goods and/or parcel goods, from containers are already known. For example, packages are delivered to distribution centers in containers, in particular in roller containers that can be moved on rollers, which first of all have to be unloaded to enable the packages to be sorted and/or processed further. Here, the containers are unloaded either by manual emptying of the containers onto a conveyor or the like or by tipping the containers onto a conveyor belt or the like.

For this purpose, the containers are moved to the point envisaged for unloading and parked there. The container can then be unloaded manually or by tipping out onto a conveyor belt. During this process, additional containers to be emptied can be queued at the point envisaged for unloading. To enable a higher throughput during the emptying of containers to be achieved, several points for emptying individual containers can be provided adjacent to one another. Furthermore, the containers which are still to be emptied can then be arranged next to one another in several rows.

For the corresponding handling of the containers, a certain area is required, namely for moving the containers to the unloading point, for the unloading point and with the corresponding unloading devices themselves and for the movement of the unloaded containers away from the unloading point. In this case, the space requirement is not inconsiderable, especially if a very large number of containers is supposed to be unloaded within a short time. On the one hand, several unloading points and sufficient space for queuing the containers ahead of the unloading points are then generally required, and, at the same time, there must be sufficient space to enable the already loaded containers to be transported away, despite the containers waiting to be emptied, thus ensuring that these containers are available again as quickly as possible to receive other packages.

It is therefore the underlying object of the invention to configure and develop the method cited at the outset and described more specifically above in such a way that the space requirement for the corresponding handling of the containers can be reduced without having to accept a significant reduction in the throughput of containers to be emptied.

BRIEF SUMMARY

According to the present disclosure, this object is achieved by a method for unloading packages from a container, in particular a roller container, having a container guide and a conveyor belt, in which the containers are moved successively along a container path by the container guide, in which, at least in some section or sections, the conveyor belt extends to the side of and at least substantially parallel to the container path, in which the containers are tipped sideways in the direction of the conveyor belt during the movement along the container guide and along the conveyor belt predetermined by the container path, in which the packages slide out of the tipped containers onto the conveyor belt, in which the conveyor belt conveys the packages that have slid out of the container onwards, and in which the emptied tipped containers are righted again during the movement along the container guide predetermined by the container path.

Thus, the invention has recognized that the conveying of the containers and the unloading of the containers can be combined to enable both operations to be performed at the same time and in the same location. The infeed and removal of containers into and from the unloading station can thus be considerably simplified and accelerated, leading to a smaller space requirement for handling the containers, especially for buffer areas for the containers. In simplified terms, the containers can be emptied on the way to being reused without the containers having to be handled at different times and places to achieve this. At the same time, it is also possible to eliminate additional unloading stations because the dwell times of the containers in the unloading station are very short since the containers can be moved through the unloading station at a relatively high speed.

It is particularly expedient here that the containers can be moved successively along a container path through the unloading station, by the container guide, in particular without having to be stopped in between. Since the containers are guided along the container path one behind the other in the conveying direction, the individual containers can furthermore follow one another at short intervals, leading to a further reduction in the space requirement. While the containers are being moved along the container path, which can but need not be at least substantially rectilinear, the containers are, at least in some section or sections, moved at least substantially parallel to a conveyor belt that is arranged to the side of the conveyor path in this region. For the emptying of the containers, it is recommended here that the conveyor belt be arranged adjoining the container path or at a short distance therefrom. In this region in which the container paths and the conveyor belt are arranged adjacent to one another, the container is tipped or tilted sideways in the direction of the conveyor belt, more specifically while the container is being guided further along the container path. In other words, the tipping or tilting of the containers can be regarded as a motion component which is superimposed on the motion of the containers along the container path. The unloading of the containers is enabled or initiated by tipping or tilting the containers. The packages contained in the containers can then slide out of the tipped or tilted containers, namely onto the adjacently positioned conveyor belt conveying the packages onwards, in particular to a sorting device for sorting the packages according to predetermined criteria, e.g. according to the delivery address. After the containers have been emptied in the manner described, the tipped or tilted containers are righted again, preferably back into an initial position before the tipping or tilting operation and/or before the unloading station. The containers are thus available for reuse.

If required, the containers are provided for unloading via one side of the containers, thus making it necessary to tip or tilt the containers out of an upright or vertical alignment by no more than 90° into a flat or horizontal alignment. This is the case especially if the containers are emptied via one side of the containers. For this purpose, it is possible there to dispense at least partially with one side wall and/or to at least partially open the side wall before the container is emptied. In principle, however, it is also alternatively or additionally possible for the containers to be emptied at the top. For this purpose, the top of the containers can be at least partially omitted and/or the top side can be at least partially opened. It is then conceivable, for example, for the containers to be tipped by more than 90°, e.g. by an angle of between 90° and 180°. In other words, therefore, the containers are turned at least partially upside down.

The conveyor belt can be interpreted as a conveyor belt of a band conveyor or belt conveyor, on which at least one band or belt is provided as a traction means for conveying the packages. However, consideration may also be given to other traction means, of the kind used in "chain conveyors". However, since the use of bands or belts is preferred, the term conveyor belt will continue to be used in the present case. Strap conveyors with a plurality of continuously circulating straps or belts arranged adjacent to one another can also be provided. As an alternative, a plurality of strap conveyors having at least one strap or belt can be provided adjacent to one another in order to form a plurality of straps and/or belts. The conveyor belt can furthermore be interpreted as a continuous conveyor belt or as a plurality of conveyor belts arranged in series. This applies especially when the conveyor belts are arranged at different heights and/or with different slopes. The conveyor belt is thus interpreted more in terms of function and can be interpreted in a very general way as required.

The packages can be repackaged goods and/or repackaged parcel goods. There are fundamentally no restrictions as regards the size, shape and type. However, it will generally be preferred if the packages can be carried and handled by one person. In particular, it is particularly advantageous according to the invention if the packages are "parcel consignments" or parcels, which are used separately and are sorted and distributed in distribution centers.

In a first particularly preferred embodiment of the method, during the tipping of the containers, during the unloading of the packages from the containers and/or during the righting of the containers, the containers are moved continuously, i.e. without interruption, along the container path. This increases the throughput and thus reduces the space requirement. Here, the containers can be moved at an at least substantially constant speed in a manner which is particularly simple in terms of design. For the reasons stated, it is furthermore expedient, as required, if the containers are moved continuously or even at an at least substantially constant speed during the entire movement of the containers along the entire container path by the container guide.

Moreover, the emptying of the containers can be performed in a particularly simple and reliable manner if the containers are pivoted about an axis at least substantially parallel to the container path during the tipping and/or during the righting process. In this way, the movement of the containers along the container path and the tipping or pivoting of the containers can be performed in a manner which is simple and reliably decoupled from one another. In this case, it is alternatively or additionally expedient for simple but gentle emptying of the containers if the containers are pivoted to the side at an at least substantially uniform, in particular at least substantially constant, angular speed during the tipping and/or during the righting process in order in this way to allow the packages to slide out of the containers.

To simplify the method and for gentle handling of the packages, it is possible, during the tipping of the containers, during the unloading of the packages and/or during the righting of the containers, for the containers to be moved at least substantially in the same direction and/or at least substantially at the same speed along a container path as that region of the conveyor belt which is arranged to the side of the containers. In this way, load peaks acting on the packages during unloading can be reduced under certain circumstances, and damage to the packages can be avoided as far as possible. Moreover, it is possible under certain circumstances to form spatially narrowly limited heaps of packages which have each been emptied from a container. However, it is also possible, during the tipping of the containers, during the unloading of the packages and/or during the righting of the containers, for the containers to be moved in the opposite direction and/or at a different speed along a container path to that region of the conveyor belt which is arranged to the side of the containers. This can contribute, for example, to assisting the unloading of the containers since the unloaded packages are in this way conveyed relative to the container or away from the container and accordingly create space for further packages that are yet to be unloaded.

It is a particularly simple matter for the containers to be moved along the container path if the containers are roller containers. These can simply be moved along the container path by means of a container guide. Otherwise, the containers can be moved along the container path in a manner suspended on a container guide, for example.

The emptying of the containers by tipping the latter is a particularly simple and reliable possibility if the containers are open at the side and/or have an opening at the top. In this context, permanent openings may be considered if required. However, it is also possible for the containers to be opened before being unloaded at the desired point. For this purpose, the containers can have flaps or straps that can be stretched in front of the opening, as already known in principle.

It is a particularly simple matter in terms of design if, during the tipping of the containers, during the unloading of the packages and/or during the righting of the containers, the containers are moved on a guideway, which may be uneven, in order to bring about the tipping process, to maintain the tipped position and/or to reverse the tipping process. Ultimately, the containers need only be moved along the guideway and the unevenness of the guideway necessarily ensures the movements of the containers sideways relative to the container path. To enable the movement of the container to be reliably predetermined, it is advisable if the containers are moved in a manner guided by at least one rail. In this case, the containers may, if required, also be moved on a guideway which is uneven in some section or sections and/or in a manner guided by at least one rail during the entire movement of the containers along the entire container path by the container guide.

Alternatively or in addition, the movement of the containers for the purpose of unloading the latter can be co-determined in a simple manner by virtue of the fact that, during the tipping of the containers, during the unloading of the packages and/or during the righting of the containers, containers are supported against an unloading rail, which can preferably be designed as an unloading wall, which defines the tilt of the containers. In this case, the unloading rail supports the containers in an alignment which limits the tipping because the containers are supported against the unloading rail. Since the containers are tilted or tipped to the side in relation to the container path, it is particularly expedient here if the unloading rail is provided between the container path and the conveyor belt. If required, the containers can be supported against an unloading rail defining the tilt of the containers during the entire movement of the containers along the entire container path by the container guide.

Moreover, at least one rail that guides the movement of the containers by means of the container guide can be designed in such a way that excessive tipping and/or insufficient tipping of the containers to the side, owing, for instance, to a very unfavorably loaded container, is avoided because the profile of the at least one rail takes account not only of the container path as such but also of the sideways tipping and re-righting of the containers.

To ensure that the packages cannot fall out of the containers onto the conveyor belt from a great height or in an uncontrolled manner, the height of the conveyor belt can be adapted in a corresponding manner along the container path. Thus, in particular, care can be taken to ensure that, in the region of the tipping of the containers, in the region of the unloading of the packages and/or in the region of the righting of the containers, the conveyor belt is at different heights in relation to the containers, in particular being moved upward and/or downward or arranged at appropriate heights. In this case, the conveyor belt is preferably raised and/or lowered in synchronism with the increasing tipping angle and/or the decreasing tipping angle and/or in synchronism with the guideway of the containers and/or in synchronism with the profile of the at least one rail. In this context, it is furthermore advisable for the conveyor belt to be moved upward and/or downward, i.e. to be raised and/or lowered, in such a way to match the movement of the containers moving adjacent to the corresponding section of the conveyor belt that the unloading height of the packages during the unloading of the packages is less than 0.6 m, preferably less than 0.5 m, in particular less than 0.4 m. With appropriate synchronization of the movements or arrangement of the conveyor belt and the containers it is furthermore preferably possible to keep the unloading height at least substantially constant, e.g. in the region of 300 mm.

The conveyor belt can be used to assist unloading to a greater extent than merely being raised and/or lowered. The conveying surface of the conveyor belt can also be tilted to correspond to the containers moving parallel to the conveyor belt. Thus, the conveyor belt can be steeper in some sections and less steep in some sections, with the result that the conveying surface assumes different angles to the horizontal and vertical in some sections, transversely to the direction of movement of the conveying surface. In the regions in which the conveying surface is more vertical and more upright next to one side of the containers, the conveyor belt can avoid accidental and/or premature unloading of the packages, for example. The packages can be held at least substantially in the containers by the conveyor belt. In the regions in which the containers are tipped and/or have been tipped, the conveying surface of the conveyor belt must also be moved into a less steep, more horizontal alignment, thus enabling the conveyor belt to receive the packages sliding out of the container. If the tipping movement of the containers and the tilting of the conveying surface of the conveyor belt are matched to one another, the packages can be unloaded gradually and gently.

Consequently, it is quite fundamentally preferred if, in a forward region of the container path, the conveying surface of the conveyor belt and that side of the containers which faces the conveyor belt are arranged at least substantially parallel to one another, in particular vertically with respect to one another, at least in some section or sections, but, in a central region of the container path, the containers and the conveyor belt are tilted jointly sideways relative to the container path and in the same direction in comparison with the forward region of the container path. In this case, that side of the containers which faces the conveyor belt and the conveying surface of the conveyor belt can remain at least substantially parallel to one another. However, this is not necessary. On the contrary, it depends on how the unloading of the packages from the containers is supposed to take place.

In this case, the tilt of the containers and the tilt of the conveying surface of the conveyor belt can be matched to one another in such a way that the conveying surface of the conveyor belt and that side of the containers which faces the conveyor belt are at least substantially parallel to one another, at least in some section or sections, even in the central region of the container path. In the central region, it is possible here, in particular, for the conveying surface of the conveyor belt to be arranged at least substantially horizontal in order to be able to receive the packages reliably. Alternatively or in addition, that side of the containers which faces the conveying surface can be arranged at least substantially horizontal in the central region in order to ensure reliable and/or rapid unloading of the packages.

However, it is also possible for the conveyor belt and the containers to be moved in such a way in the central region that, in the central region of the container path, the conveying surface of the conveyor belt and that side of the containers which faces the conveyor belt are arranged at least substantially in a V shape with respect to one another, at least in some section or sections. If, for example, the distance between the conveyor belt and the side of the containers is smaller toward the bottom and larger toward the top, the packages can be unloaded relatively gently in layers from the top down and, during this process, can enter the V-shaped gap between the conveying surface of the conveyor belt and the corresponding containers. The further the containers and preferably the conveying surface of the conveyor belt are tilted, the more the container is emptied. During this process, the angle between the conveyor belt and that side of the container which faces the conveyor belt can increase in steps, steadily or continuously if required in order to promote the increasing unloading of the packages.

Depending on the containers used and/or depending on the packages, it may be expedient to unload the packages via that side of the container which faces the conveying surface of the conveyor belt and/or via the upper opening, i.e. the top, of the container. If the containers are, so to speak, emptied "headfirst" via the upper opening, this avoids a situation, if required, where containers are not completely emptied. In principle, however, this makes the handling of the containers more complex. It may furthermore be preferred here for the containers to be emptied in the central region of the container path.

In order to ensure that the unloaded packages are received reliably by the conveyor belt, it is in principle advisable for the conveying surface of the conveyor belt to extend horizontally, at least in some section or sections. This is advisable, when required, especially in the central region of the container path when the containers are emptied there.

In order to empty the containers reliably, it may be advisable, depending on the containers used and/or depending on the packages, to turn the containers at least substantially upside down for unloading. If unloading takes place in the central region of the container path, there is a further preference for the turning upside down of the containers to take place in the central region of the container path as well.

Alternatively or in addition, it is also possible for the emptying of the containers to be promoted by raising the containers relative to the conveying surface of the conveyor belt, especially in the central region of the container path. In this way, it is possible, for example, for the distance between the containers and the conveying surface of the conveyor belt to be increased in steps or continuously in order in this way to achieve slow and gentle unloading of the packages. This raising of the containers may be considered especially when the distance between the containers and the conveyor belt at the beginning of unloading is so small that none or not all of the packages can be unloaded. The unloading of the packages may then be hindered by the conveying surface of the conveyor belt. Raising the containers makes the distance or gap between the containers and the conveyor belt larger, thus enabling further packages to slide out of the containers. In order to achieve the effect described, it would in principle also be possible, as an alternative or in addition, to lower the conveying surface relative to the container. The extent to which this will be preferred depends on the boundary conditions of the individual case.

Especially in a rearward region of the container path, the in the forward and/or central region of the container path those sides of the containers which face the conveyor belt can be tilted sideways in the opposite direction to the central region of the container path. Thus, the containers can be righted again after the packages have been unloaded, thus enabling the containers to be subsequently reloaded with other packages.

Particularly in order to reestablish an initial position of the containers after the unloading thereof, the unloaded containers can then be righted again, in particular in the rearward region of the container path. Alternatively or in addition, those sides of the containers which previously faced the conveyor belt can be aligned at least substantially vertically.

To ensure that unwanted shear forces on the packages or unwanted squashing of the packages between the container and the conveying path does not occur, especially in the forward region of the container path, in the central region of the container path and/or in the rearward region of the container path, the selected conveying speed of the containers along the container path can be at least substantially the same as, in particular at least substantially identical with, the conveying speed of the conveying surface of the conveyor belt. In this case, the direction of the speeds should furthermore at least substantially coincide. Depending on the arrangements of the containers relative to the conveyor belt, a uniform speed and conveying direction of the containers and the conveyor belt can lead to the impossibility of emptying the containers completely or at all. The already emptied packages can then hinder the unloading of additional packages. In other words, it is not possible in each case to unload the packages of the containers jointly as a separate pile from the container as required. To assist unloading, preferably in these cases, the conveying speeds of the containers along the container path can be different from the conveying speed of the conveying surface of the conveyor belt in the region adjoining the containers, in particular in the forward region of the container path, in the central region of the container path and/or in the rearward region of the container path. Alternatively or in addition, however, to serve the same purpose, the conveying direction of the containers may if required be different from the conveying direction of the conveyor belt in the region adjoining the containers. Here, at least substantially opposed conveying directions may be considered, in particular.

BRIEF DESCRIPTION OF THE DRAWING

The invention is explained in greater detail below by means of a drawing, which shows only illustrative embodiments. In the drawing:

FIG. 2 shows an unloading station for performing a first method according to the invention for unloading packages from containers, in a schematic and perspective view;

FIGS. 3A-D show the unloading station from FIG. 1 with a container in different positions along a container path, in different schematic sectional views;

FIGS. 5A-D show the unloading station from FIG. 3 with a container in different positions along a container path, in different schematic sectional views;

FIGS. 7A-D show the unloading station from FIG. 5 with a container in different positions along a container path, in different schematic sectional views.

DETAILED DESCRIPTION

Figure 1:
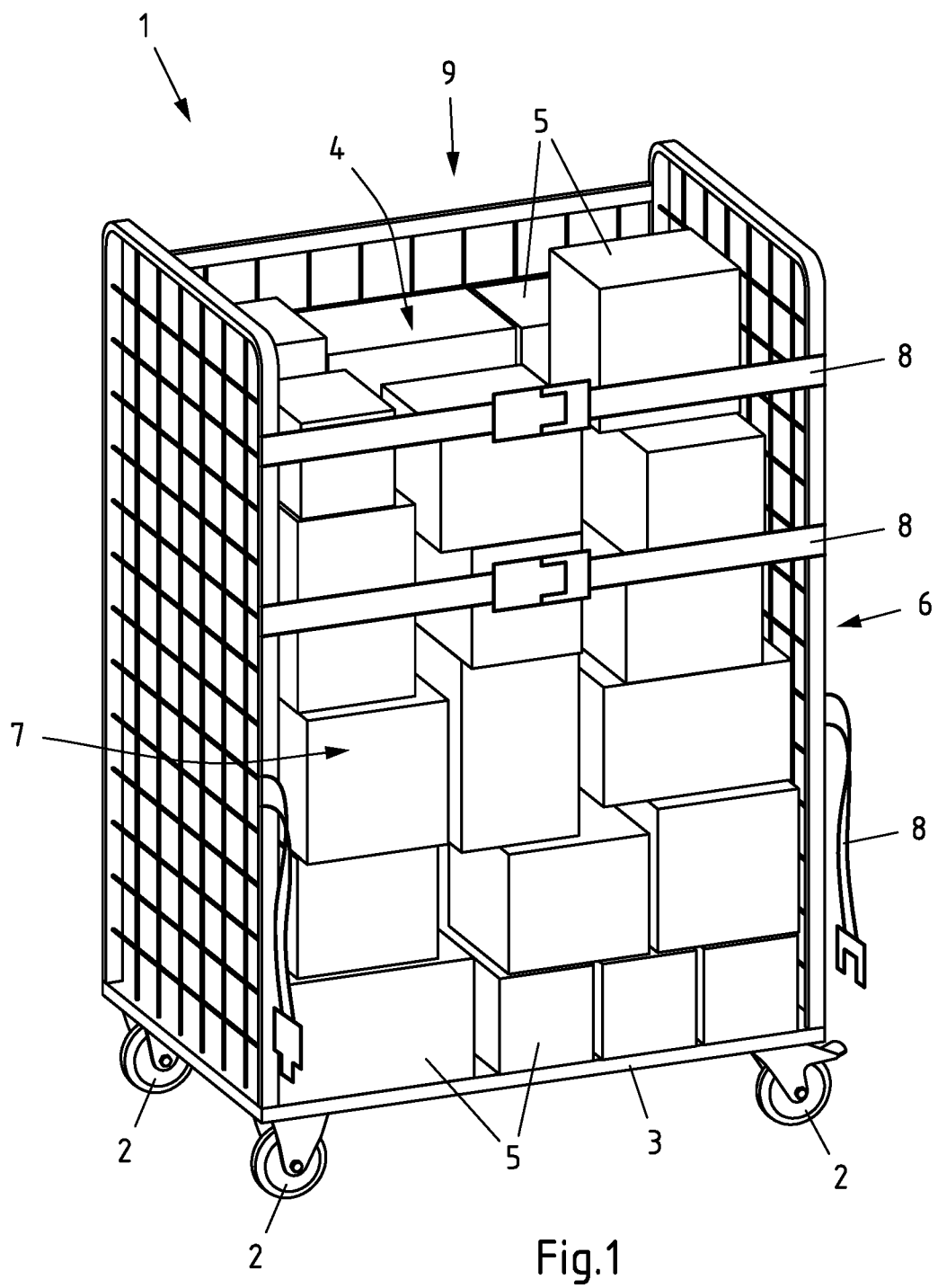
FIG. 1 shows a container which contains packages and is to be unloaded in an unloading station, in a perspective view.

FIG. 1 illustrates, by way of example, a container 1 which is especially suitable for use with an unloading station. In principle, however, other containers are also suitable. The container in FIG. 1 is in the form of a "roller container", which has rollers 2 on the bottom, by means of which the container 1 can be moved along a guideway. Above the bottom 3, the container 1 forms a loading space 4 for receiving packages 5. To enable the container 1 to be loaded easily with packages 5, a lateral opening 7 is provided in at least one side wall 6 of the container 1 and can be at least partially closed to ensure that no packages 5 fall out accidentally. The opening 7 can extend over the entire height of the corresponding side wall 6 of the container 1, as illustrated in FIG. 1. Alternatively, however, it is also possible for the lateral opening 7 to extend over only part of the side wall 6. For the at least partial closure of the lateral opening 7, straps 8 are arranged on the container in a manner distributed over the height of the opening 7, and these can be stretched transversely to the opening 7 and released again at least at one end. Alternatively, however, it would also be possible, for example, to provide a flap to close the opening 7, which flap can be pivoted into an open position, for example, to expose the opening 7. At the top, the illustrated and to this extent preferred container 1 is open, and therefore it would also be possible, if required, for packages 5 to be loaded from the top and/or to be emptied via the top side 9.

FIG. 2 illustrates an unloading station for unloading packages from a container, comprising a conveyor belt which, at least in some section or sections, is arranged laterally adjacent to a guideway for moving containers along a container path. In this case, that side of the container which faces the conveyor belt is preferably opened during the feeding of the containers to the unloading station. Here, the containers may correspond to the container shown in FIG. 1. However, this is not essential.

In the illustrated and to this extent preferred unloading station 10, the conveying surface 11 of the conveyor belt 12 is aligned at least substantially horizontally in the transverse direction with respect to the conveying direction T of the conveyor belt 12. Moreover, the conveyor belt 12 extends substantially parallel to the guideway 13 and to the container path 14 of the containers 1 to be unloaded, wherein, in the region of the top strand 15, the conveying surface 11 of the conveyor belt 12 is lowered in some section or sections in the conveying direction T and in relation to the containers 1 guided in parallel along the container path 14. In the case of the illustrated and to this extent preferred unloading station 10, the conveying surface 11 of the conveyor belt 12 is lowered continuously and with a constant slope. However, this could also be implemented in a different way if required.

The guideway 13 for moving the containers 1 along the container path 14 is, for its part, formed at least substantially parallel to the conveyor belt 12, at least in some section or sections. However, the guideway 13 is also not formed evenly. The guideway 13 is raised in the direction of the container path 14 in some section or sections. Here, the maximum difference in height in the guideway 13 on the side facing away from the conveyor belt 12 is greater than on the side of the guideway 13 facing the conveyor belt 12. If required, the guideway 13 can even be formed evenly on the side facing the conveyor belt 12.

Since, in the present case, the containers 1 are roller containers, which have rollers 2 for moving the containers 1 on the underlying surface, two rails 16, 17 are provided for predetermining the movement of the containers 1 along the guideway 13 or along the container path 14, said rails being associated with the two opposite sides of the containers 1 in the illustrated and to this extent preferred unloading station 10. Adjoining the conveyor belt 12, a rail 16 is provided, in which the rollers 2 of the containers 1 are accommodated during movement along the container path 14. In this case, the rollers 2 of the containers 1 are gripped positively by a container guide 18 and are moved along the rail 15 together with the containers 1. The containers 1 are moved successively along the container path 14 at predetermined speeds with the aid of the container guide 18. In principle, it would also be sufficient if only one roller 2 per container 1 were accommodated in the rail 16 and/or gripped by the container guide 18. It is also possible to provide a container guide 18 which grips the containers 1 in a way other than at the wheels 2 for guidance along the container path 14.

In the illustrated and to this extent preferred unloading station 10, the other rail 17 serves as a guide rail, which limits the sideways tilt of the containers 1 by positive-locking contact between the container 1 and the guide rail 17. To reduce the friction on the containers 1, provision can be made for the rail 17 to come into contact with the containers 1 only when these are tending to tip over to one side. Alternatively or in addition, the rail 17 could also have rollers 2 for contact with the containers 1. It would also be possible for positive-locking engagement of the second rail 17 and of the containers 1 to be provided during or for movement along the container path 14, but in principle this would lead to higher design complexity.

An unloading rail 19 is provided, at least in some section or sections, between the conveyor belt 12 and the guideway 13 of the containers 1 and of the container path 14, and, in the illustrated and to this extent preferred unloading station 10, said rail is formed by an upper end of an unloading wall 20. While they are being moved along the container path 14, the containers 1 are tipped sideways in the direction of the conveyor belt 12 and then righted again by virtue of the uneven guideway 13 for the containers 1. Here, the unloading rail 19 serves to predetermine and control the different tilts of the containers 1 or the variation in the tilt of the containers 1 along the container path 14. While the containers 1 are being tipped to the side, have been tipped to the side and/or are being righted again, the containers 1 are supported on the unloading rail 19 by means of the side facing in the direction of the conveyor belt 12. In the illustrated and to this extent preferred unloading station 10, the rail 17 on the side facing away from the conveyor belt 12 simultaneously prevents the container 1 tipping over the unloading rail 19 onto the conveyor belt 12, namely by positive-locking contact between the containers 1 and said rail 17. The contour of the unloading rail 19 and the contour of the guideway 13 for the containers 1 along the container path 14 determine the variation in the sideways tilt of the containers 1 and hence the unloading of the packages 5 from the containers 1. To reduce the friction between the unloading rail 19 and the containers 1, the guide rail 19 could also have rollers 2 for contact with the containers 1.

Figure 3B:
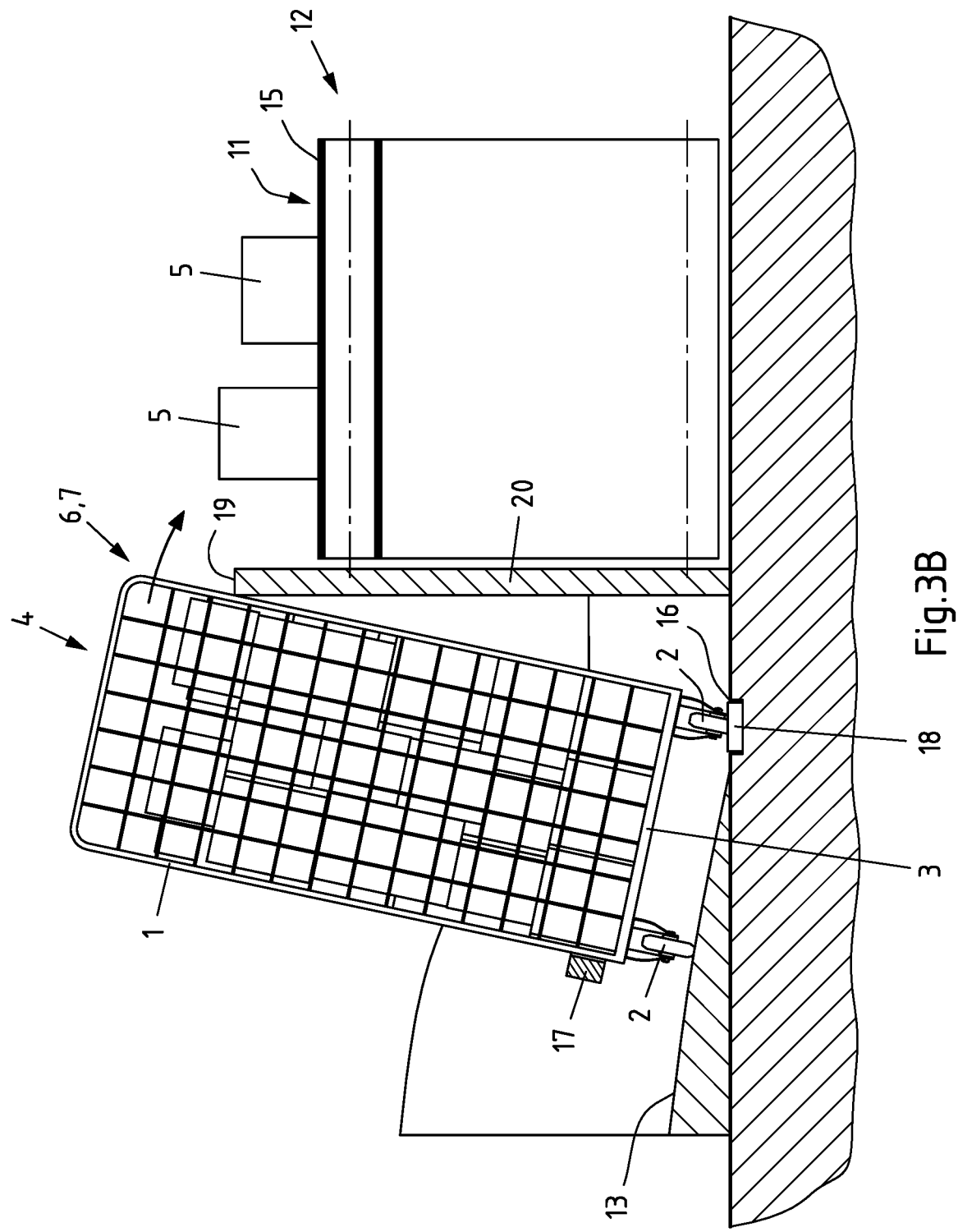

Initially, the container 1, as illustrated in FIG. 3A, is arranged at least substantially upright, and the container 1 is guided by the container guide 18 in the conveying direction of the containers 1. During this process, the container 1 gradually moves on to a section of the guideway 13 which slopes to the side in the direction of the conveyor belt 12, as illustrated in FIG. 3B. In this way, the container is raised on the side facing away from the conveyor belt 12 and tilted in the direction of the conveyor belt 12. During this process, the container 1 is furthermore also held at a certain tilt by contact with the unloading rail 19 and, if required, also by contact with the rail 17, designed as a guide rail, on that side of the container 1 which faces away from the conveyor belt 12. In this case, the conveyor belt 12 in the illustrated and to this extent preferred unloading station 10 is arranged below the unloading rail 19, ensuring that the uppermost packages 5 in the container 1 fall out of the container 1 and onto the conveyor belt 12 from quite a small height. The falling height can be adjusted by adapting the vertical distance between the unloading rail 19 and the conveying surface 11 of the conveyor belt 12.

During the further progress of the container 1 along the guideway 13 or along the container path 14, the container 1 is tilted further to the side in the direction of the conveyor belt 12 owing to a larger sideways tilt of the guideway 13, as illustrated in FIG. 3C. In the illustrated and to this extent preferred unloading station 10, the container 1 is furthermore raised somewhat overall. Moreover, the unloading rail 19 is lowered, and therefore the lower layers of packages 5 can also be unloaded from the containers 1. Since the sideways tilt of the container 1 increases along the container path 13, while the conveyor belt 12 and the unloading rail 19 are lowered relative to the container 1, the packages 5 are emptied successively from the top down relative to the container 1, wherein the packages 5 in all cases fall onto the conveyor belt 12 from a relatively small height at different points along the container path 14. If the course of the guideway 13, the unloading rail 19 and the conveyor belt 12 are matched to one another in an appropriate manner, the falling height of the packages 5 can be kept approximately constant and/or to a low level along the container path 14.

Figure 3D:
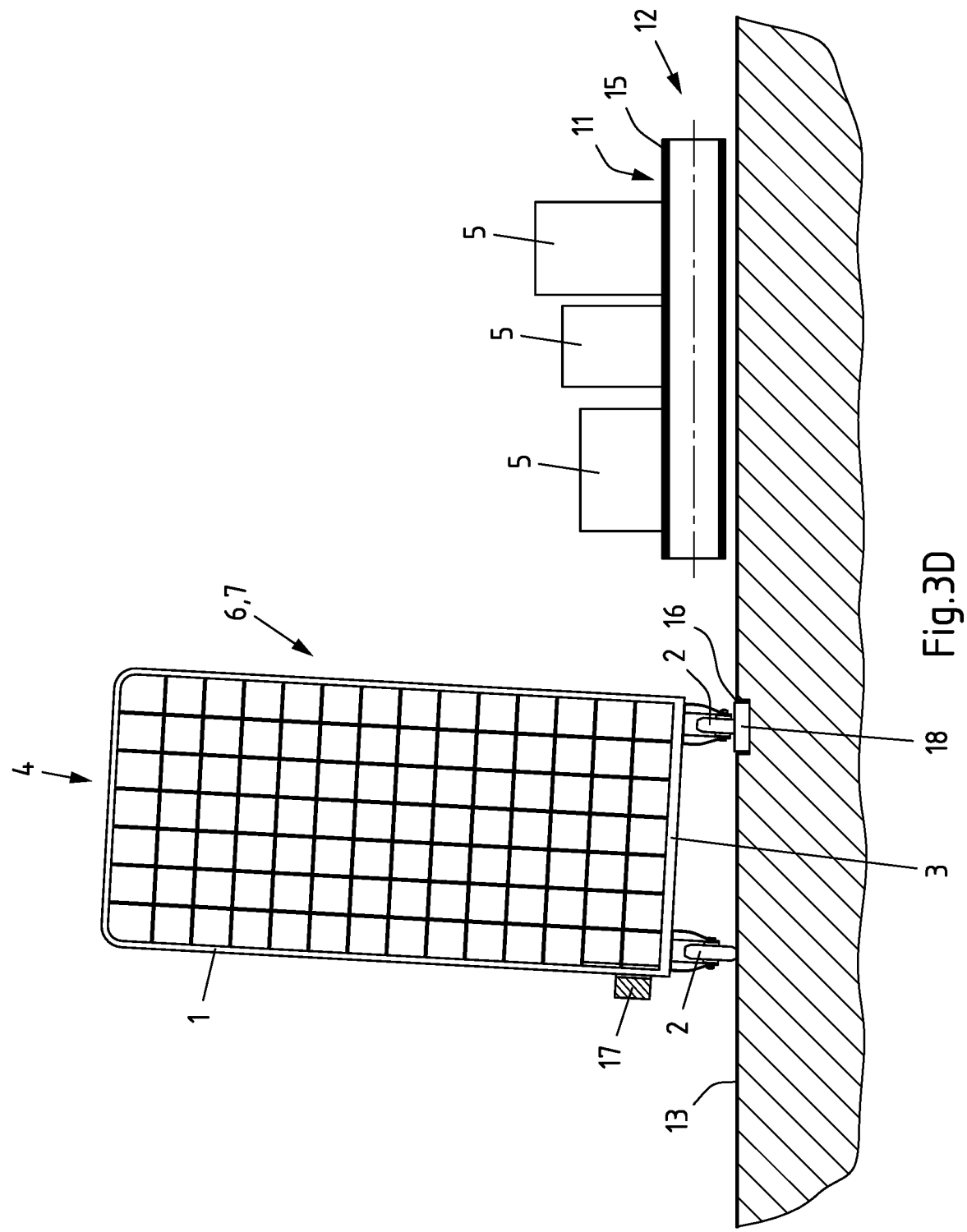

After all the packages 5 have been unloaded from the containers 1, the guideway 13 makes a transition once again to a level section, the containers 1 thus being righted during this process, as illustrated in FIG. 3D. The containers 1 can then also be moved out of the rail 16 by the container guide 18, if required. The containers 1 can then be moved to a different destination point, while the unloaded packages 5 can be taken for sorting, for example.

Figure 4:
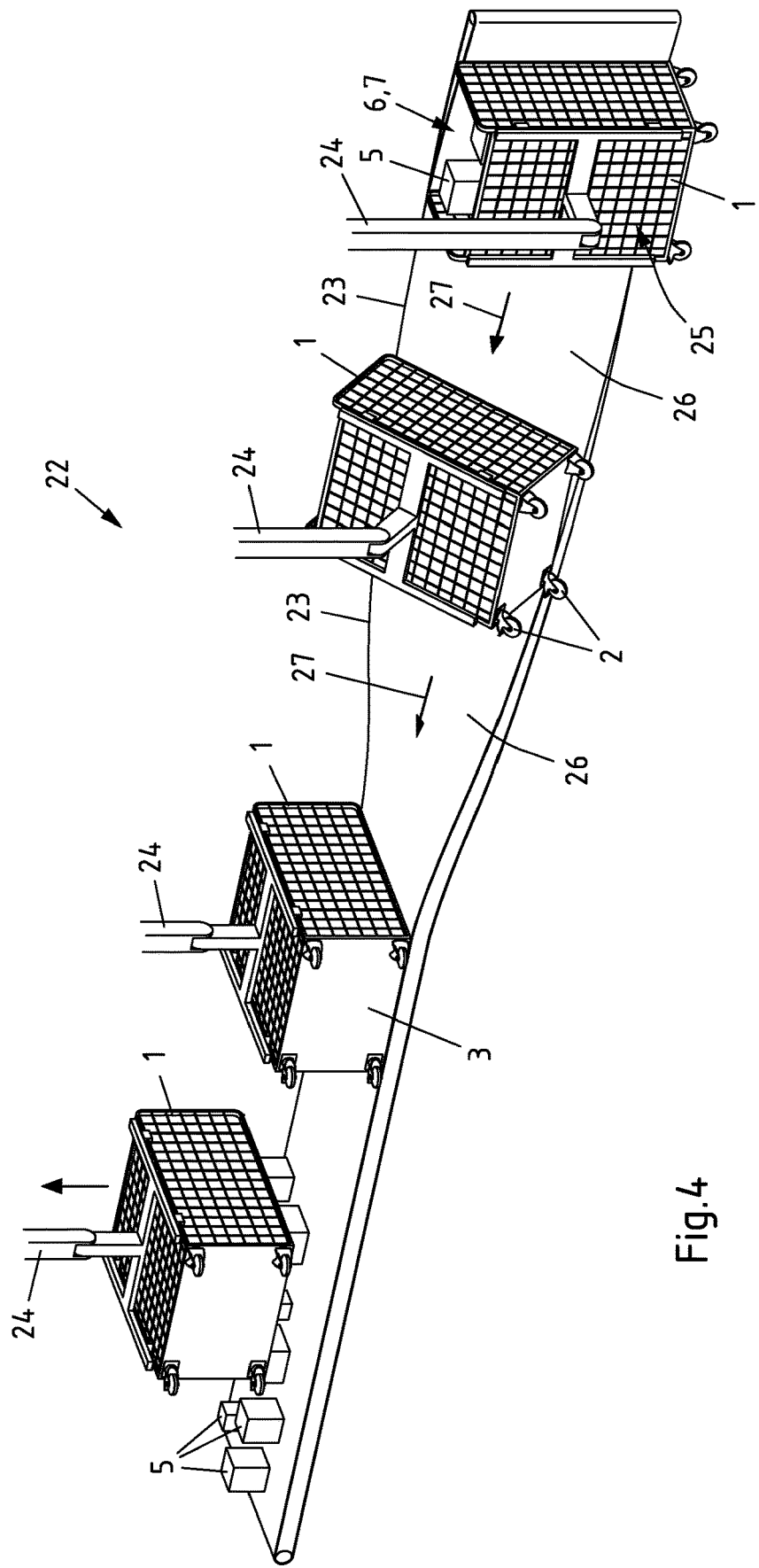
FIG. 4 shows an unloading station for performing a second method according to the invention for unloading packages from containers, in a schematic and perspective view.

FIG. 4 shows another unloading station 22 for unloading packages 5 from containers 1, in a schematic and perspective view. The unloading station 22 comprises a conveyor belt 23 and a container guide 24, which engages on the rear side 25 of the containers 1 in the illustrated and to this extent preferred unloading station 22. However, other container guides would likewise be conceivable. During the transfer of the containers 1 to the container guide 24, that side wall 6 of the containers 1 which faces the conveyor belt 12 is preferably opened. Here, the containers 1 may correspond to the container 1 shown in FIG. 1. However, this is not essential.

Figure 5A:
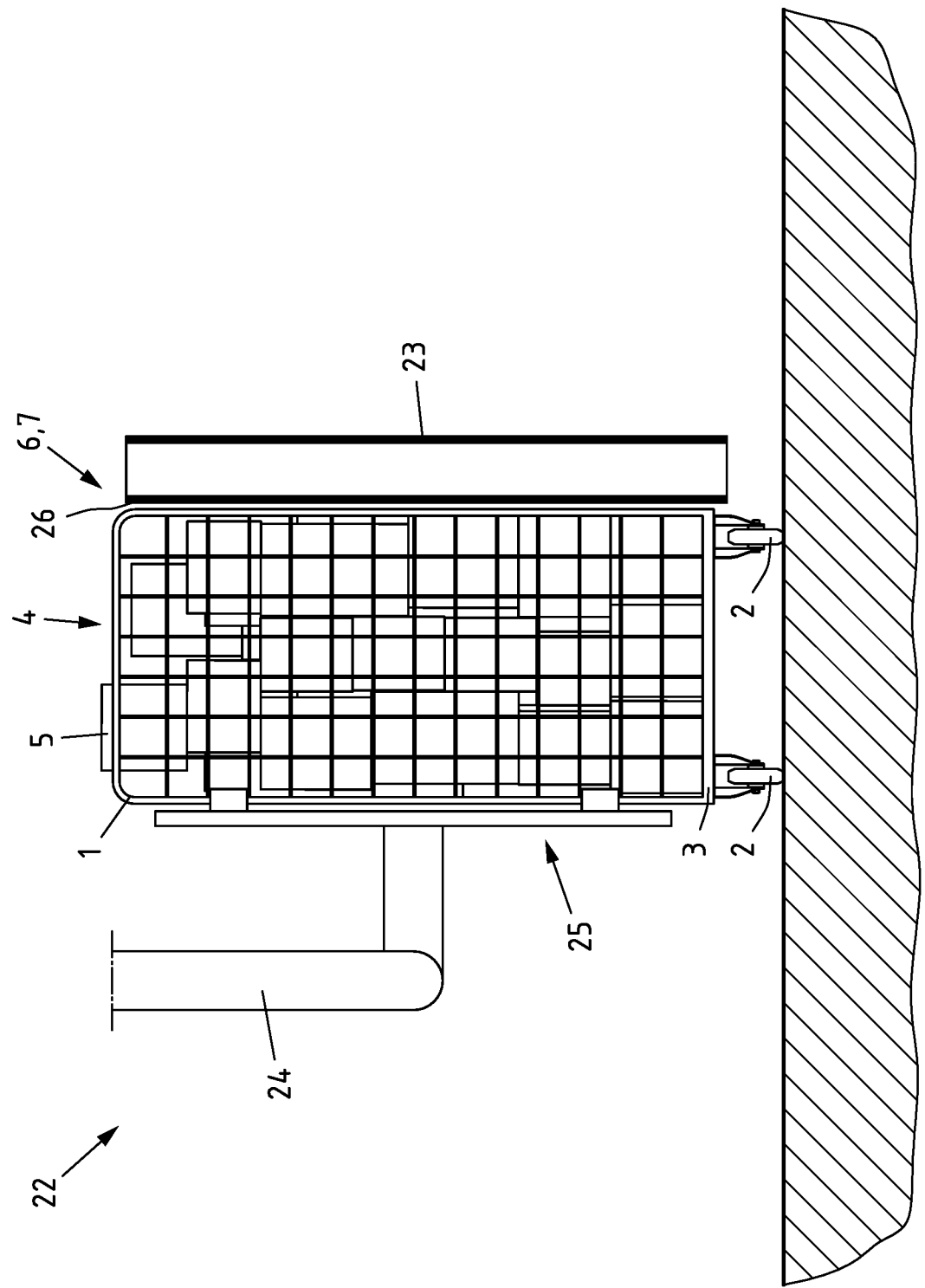

As illustrated in detail in FIG. 5A, the upright containers 1 are then positioned with the opened and at least substantially vertical side wall 6 close to a conveying surface 26 of the conveyor belt 23, which conveying surface is likewise upright and is arranged at least substantially vertical. During this process, the container 1 and the conveying surface 26 of the conveyor belt 23 can be aligned at least substantially parallel to one another. The short distance between the open side wall 6 of the container 1 and the conveying surface 26 of the conveyor belt 23 prevents packages 5 falling out of the container 1 at this stage. The containers 1 are then moved in the direction of the container path 27, preferably at approximately the same speed as the conveying surface 26 of the conveyor belt 23.

Figure 5B:
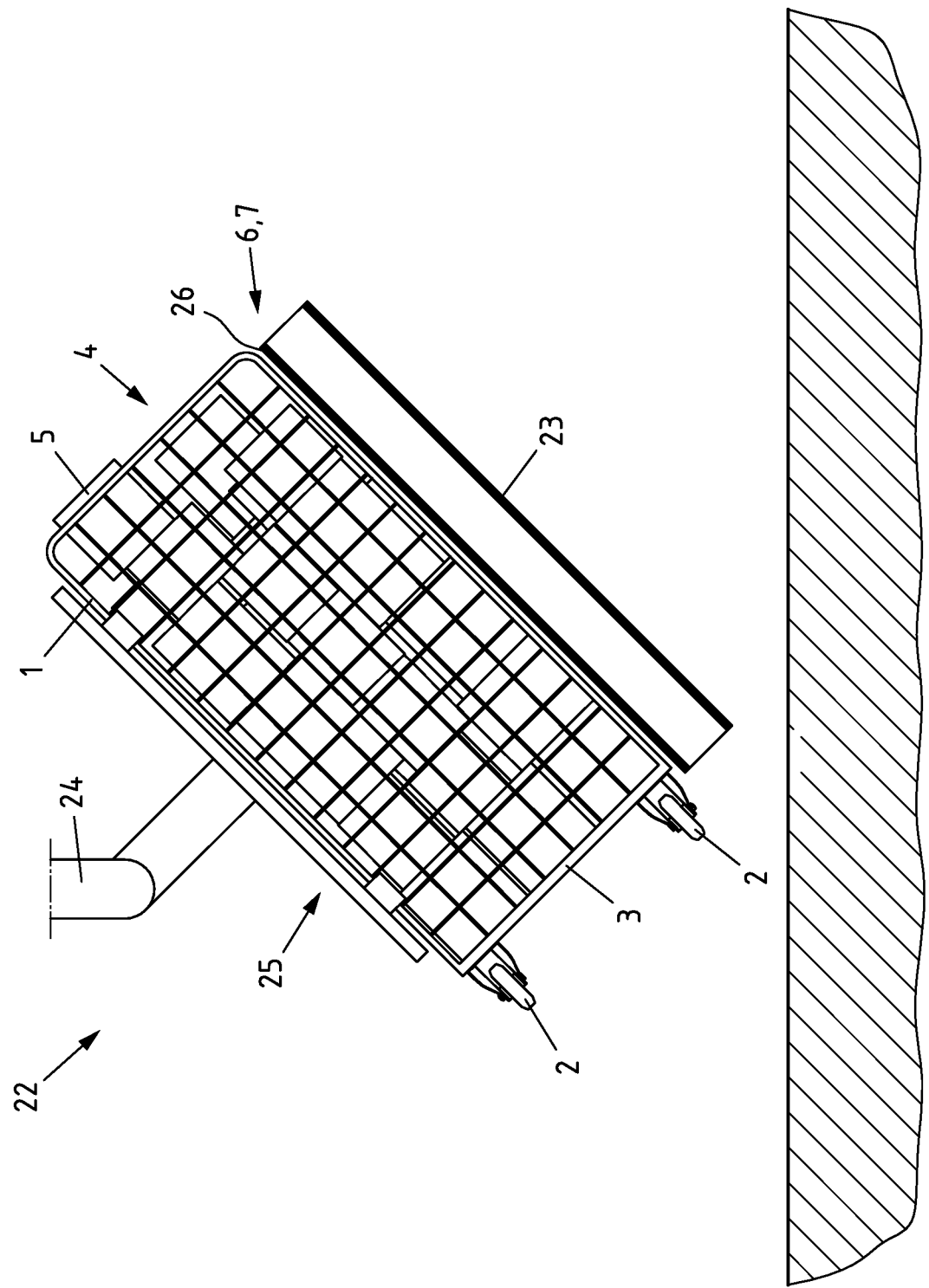

In this case, as illustrated in detail in FIG. 5B, the containers 1 are slowly tilted to the side in the direction of the conveyor belt 23, and, during this process, the conveying surface 26 of the conveyor belt 23 is tilted to the same side in a manner corresponding to the opened side wall 6 of the containers 1. During this process, the opened side wall 6 of the containers 1 and the adjoining conveying surface 26 of the conveyor belt 23 remain aligned at least substantially parallel to one another in order to avoid packages 5 falling out of the containers 1. In the illustrated and to this extent preferred unloading station 22, both the opened side wall 6 of the containers 1 and the conveying surface 26 of the conveyor belt 23 are pivoted into an at least substantially horizontal position, as illustrated in detail in FIG. 5C. Even then, the opened side of the containers 1 and the adjoining conveying surface 26 of the conveyor belt 23 are preferably still aligned substantially parallel to one another. To ensure that no packages 5 can slide out in an uncontrolled manner via the top side 9 of the containers, the top side 9 of the containers 1 can be closed perpendicularly to the surface of the conveyor belt 23, if required, e.g. by means of straps or by means of a structural measure.

As illustrated in detail in FIG. 5D, the container guide 24 then raises the containers 1 relative to the conveying surface 26 of the conveyor belt 23, thus enabling the packages 5 to slide out of the container 1 and to be conveyed onwards separately by the conveyor belt 23. Alternatively or in addition, the conveying surfaces 26 of the conveyor belt 23 could also be lowered relative to the containers 1. Subsequently, the containers 1 are preferably righted again by the container guide 24 and are then separated from the container guide 24. The containers 1 can then be conveyed separately to a destination point and then loaded with other packages 5, if required, while the unloaded packages 5 are taken for sorting, for example.

Figure 6:
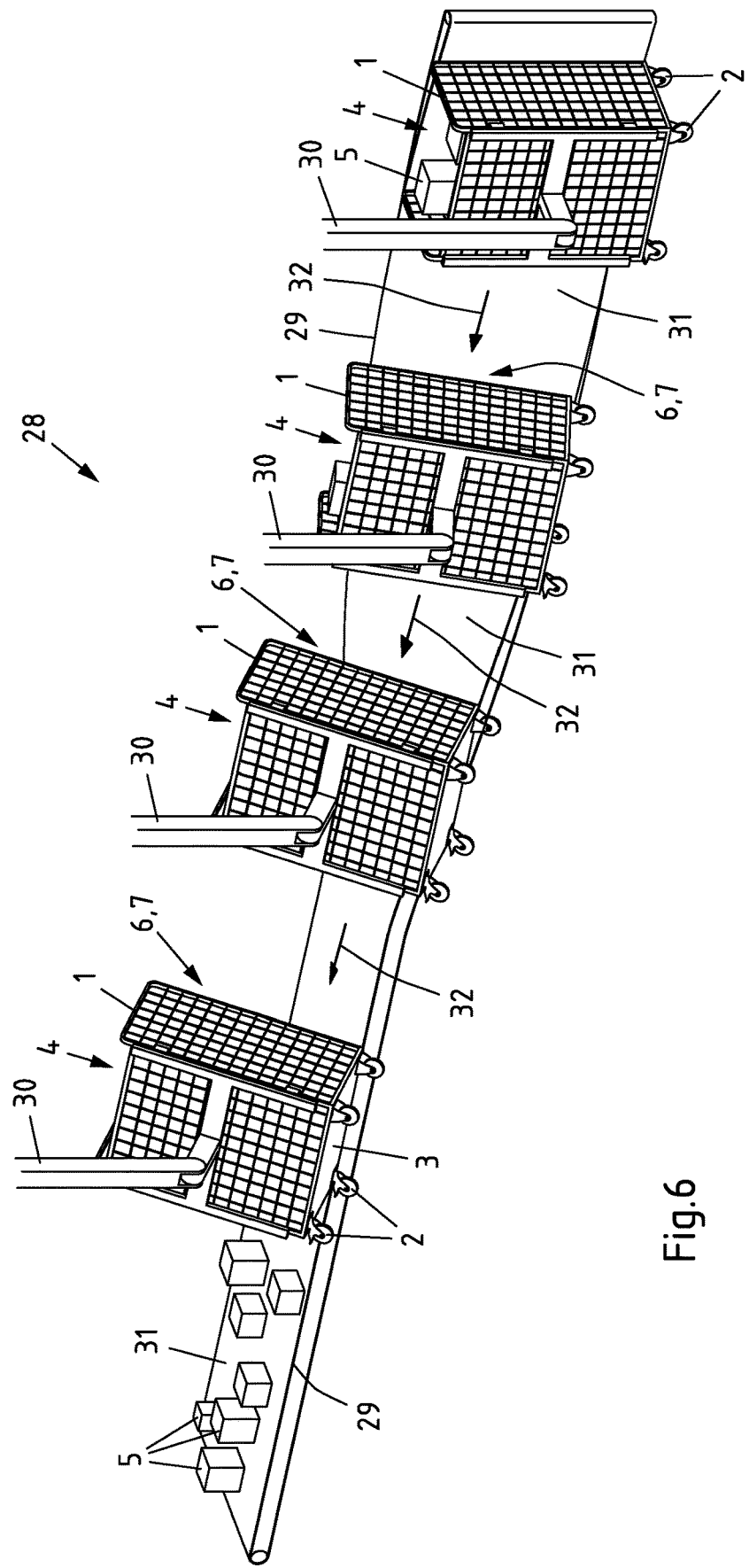
FIG. 6 shows an unloading station for performing a third method according to the invention for unloading packages from containers, in a schematic and perspective view.

FIG. 6 shows an alternative unloading station 28 for unloading packages 5 from containers 1, in a schematic and perspective view. The unloading station 28 comprises a conveyor belt 29 and a container guide 30, which engages on the rear side 25 of the containers 1 in the illustrated and to this extent preferred unloading station 28. However, other container guides would likewise be conceivable. During the transfer of the containers 1 to the container guide 30, that side wall 6 of the containers 1 which faces the conveyor belt 29 is preferably opened. Here, the containers 1 may correspond to the container 1 shown in FIG. 1. However, this is not essential.

Figure 7A:
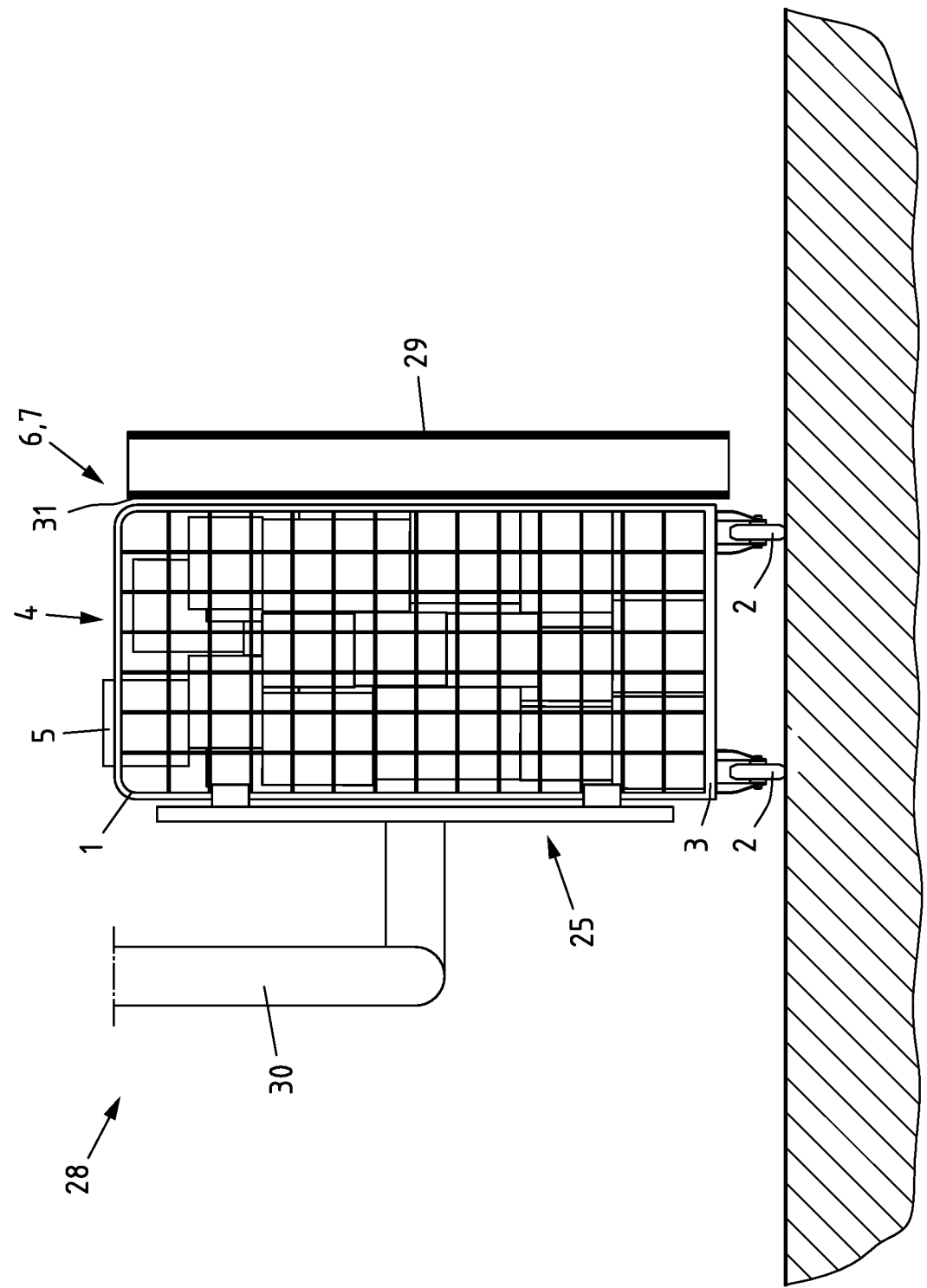

As illustrated in detail in FIG. 7A, the upright containers 1 are then positioned with the opened and at least substantially vertical side wall 6 at a short distance from a conveying surface 31 of the conveyor belt 29, which conveying surface is likewise upright and is arranged at least substantially vertical. During this process, the container 1 and the conveying surface 31 of the conveyor belt 29 can be aligned at least substantially parallel to one another. The short distance between the open side wall 6 of the container 1 and the conveying surface 31 prevents packages 5 falling out of the container 1 at this stage. The containers 1 are then moved in the direction of the container path 32, e.g. at approximately the same speed as the conveying surface 31 of the conveyor belt 29.

Figure 7B:
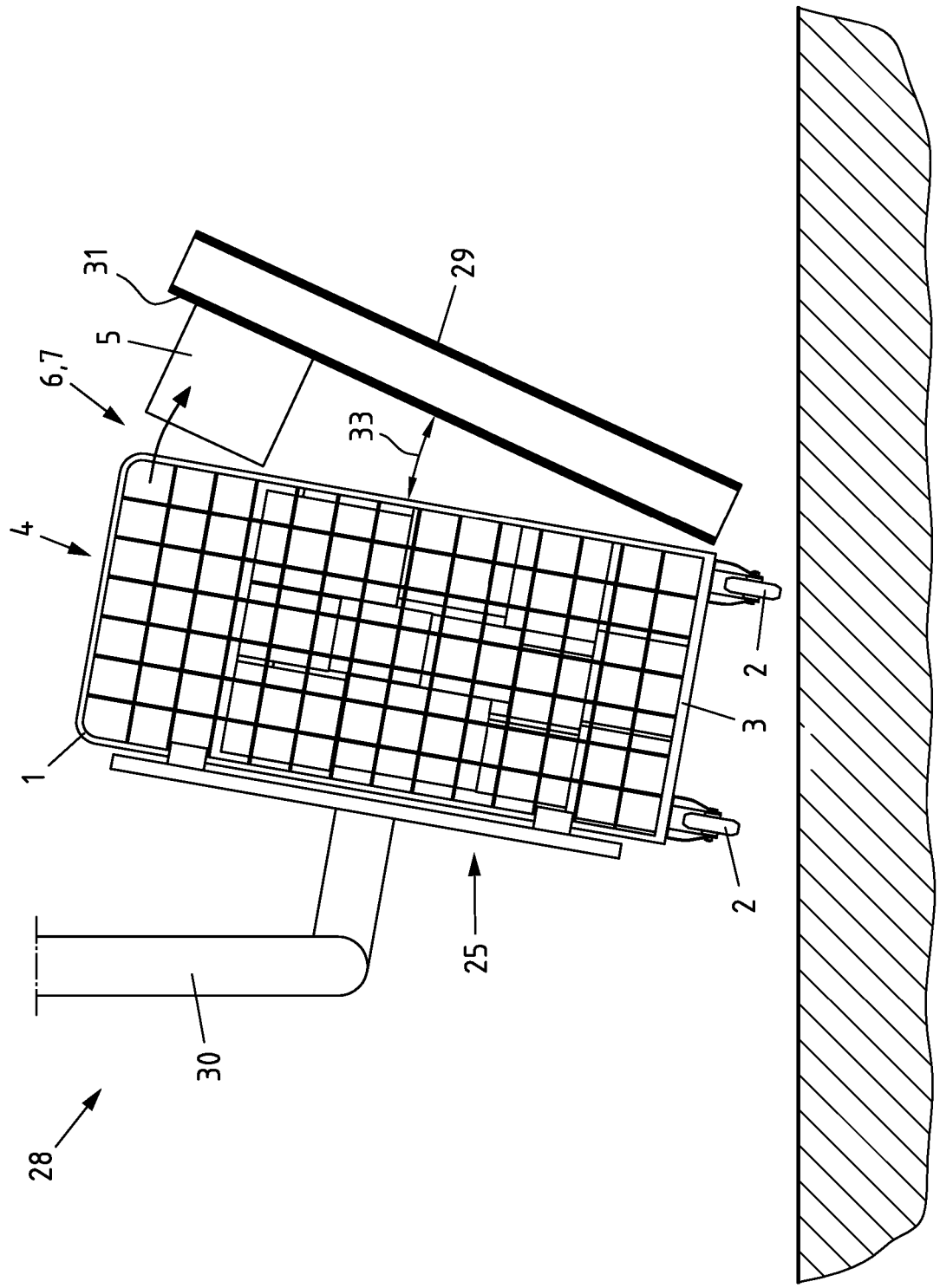

In this case, as illustrated in detail in FIG. 7B, the containers 1 are slowly tilted to the side in the direction of the conveyor belt 29. During this process, the conveying surface 31 of the conveyor belt 29 is tilted to the same side in a manner corresponding to the opened side wall 6 of the containers 1. During this process, however, the conveying surface 31 of the conveyor belt 29 is in each case tilted further to the side than the adjoining side of the container 1, with the result that the corresponding side of the container 1 and the conveying surface 31 of the conveyor belt 29 are arranged in a V shape. With increasing movement of the containers 1 in the direction of the container path 32, the opening angle 33 of this V-shaped arrangement increases, as illustrated in detail in FIG. 7C.

Figure 7D:
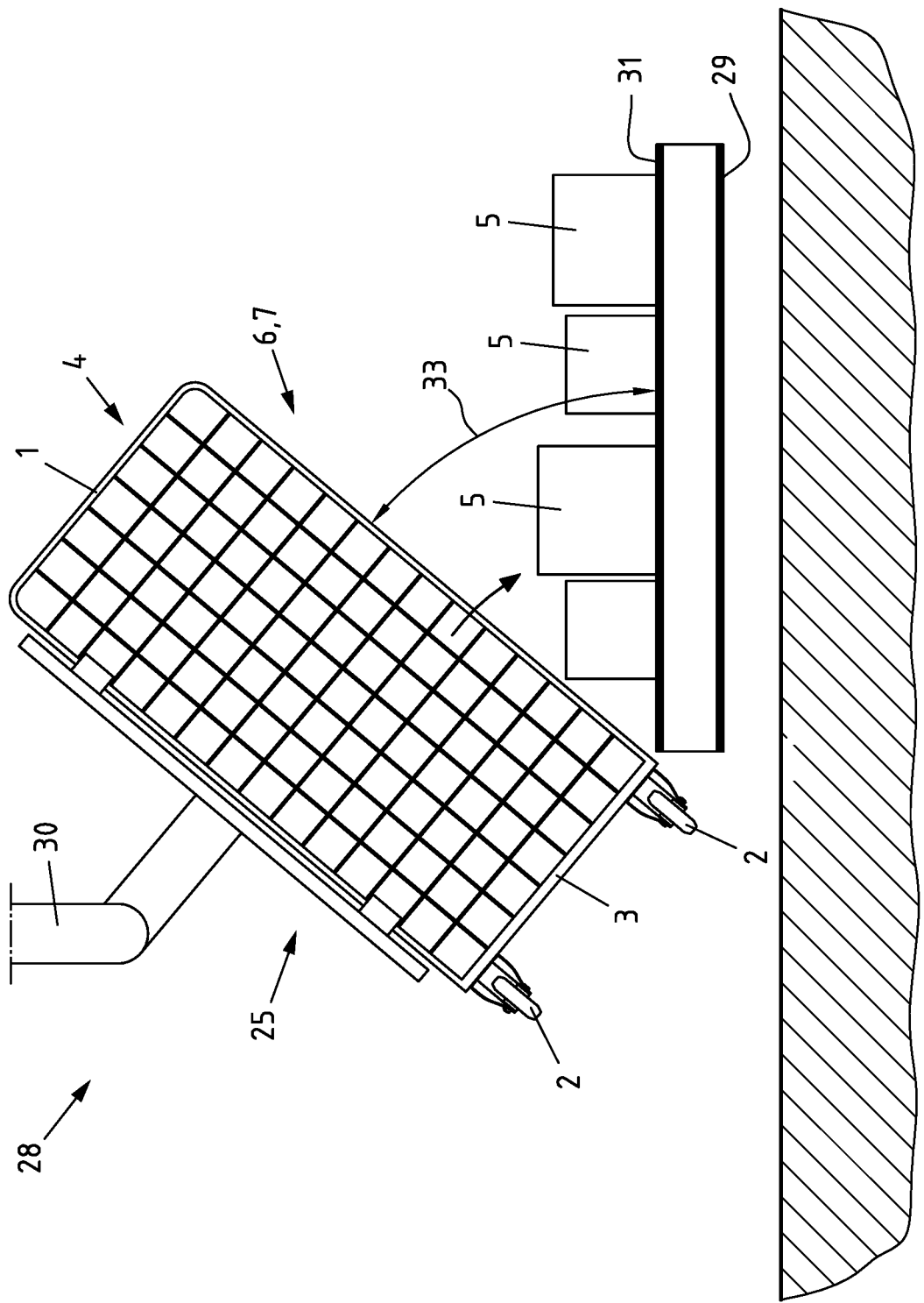

In the illustrated and to this extent preferred unloading station 28, the conveying surface 31 of the conveyor belt 29 is pivoted into an at least substantially horizontal position, as illustrated in detail in FIG. 7D. However, the adjoining side of the containers 1 remains aligned obliquely. Owing to the increasing tilt of the containers 1 and of the conveying surface 31 of the conveyor belt 29, which are always arranged in a V shape relative to one another during this process, wherein the opening angle 33 of this V-shaped arrangement steadily increases, the packages 5 slide successively from the top down out of the containers 1 and are caught by the conveying surface 31 of the conveyor belt 29. If the conveying surface 31 of the conveyor belt 29 is preferably moved at least substantially the same speed during this process as the containers 1 are being moved along the container path 32 by the container guide 30, squashing of the packages 5 between the containers 1 and the conveyor belt 29 is avoided, as is falling from the conveyor belt 29. However, different speeds are nevertheless conceivable if unloading, in particular the complete unloading of the containers, After the containers 1 have been emptied and the packages have been released to the conveyor belt 29, the containers 1 are preferably righted again by the container guide 30 and then separated from the container guide 30. The containers 1 can then be conveyed separately to a destination point and loaded there with other packages 5, if required, while the emptied packages 5 are taken for sorting, for example.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for unloading packages from a container having a container guide and a conveyor belt, the method comprising the steps of:
    moving the containers successively along a container path by the container guide,
    extending, at least in some section or sections, the conveyor belt to the side horizontally offset from and at least substantially parallel to the container path,
    tipping the containers sideways in the direction of the conveyor belt during the movement along the container guide and along the conveyor belt predetermined by the container path,
    sliding the packages out of the tipped container onto the conveyor belt,
    conveying the packages that have slid out of the container onwards on the conveyor belt, and
    righting the emptied tipped containers again during the movement along the container guide predetermined by the container path.

2. The method according to claim 1, wherein, during the tipping of the containers, during the unloading of the packages, and/or during the righting of the containers, the containers are moved continuously along the container path.

3. The method according to claim 2, wherein the containers are moved continuously along the container path with an at least substantially constant speed.

4. The method according to claim 1, further comprising:
    pivoting the containers about an axis at least substantially parallel to the container path during the tipping and/or during the righting process, and/or
    pivoting the containers to the side at an at least substantially uniform angular speed during the tipping and/or during the righting process.

5. The method according to claim 1, wherein, during the tipping of the containers, during the unloading of the packages, and/or during the righting of the containers, the method further comprises moving the containers at least substantially in the same direction and/or at least substantially at the same speed along a container path as the region of the conveyor belt which is arranged to the side of the containers.

6. The method according to claim 1, wherein the containers are roller containers and/or laterally open containers.

7. The method according to claim 6, wherein, during the tipping of the containers, during the unloading of the packages, and/or during the righting of the containers, the method further comprises moving the containers on a guideway which is uneven in some section or sections and/or in a manner guided by at least one rail.

8. The method according to claim 1, wherein, during the tipping of the containers, during the unloading of the packages, and/or during the righting of the containers, the method further comprises supporting the containers against an unloading rail between the container path and the conveyor belt, said rail defining the tilt of the containers.

9. The method according to claim 1, wherein, in the region of the tipping of the containers, in the region of the unloading of the packages, and/or in the region of the righting of the containers, the conveyor belt is at different heights in relation to the containers.

10. The method according to claim 1, wherein, in a forward region of the container path, the conveying surface of the conveyor belt and the side of the containers which faces the conveyor belt are arranged at least substantially parallel to one another at least in some section or sections,
    wherein, in a central region of the container path, the containers and the conveyor belt are tilted jointly to the side relative to the container path and in the same direction, in comparison with the forward region of the container path.

11. The method according to claim 10,
    wherein, in the central region of the container path, the conveying surface of the conveyor belt and the side of the containers which faces the conveyor belt are arranged at least substantially parallel to one another at least in some section or sections, and/or
    wherein, in the central region of the container path, the conveying surface of the conveyor belt and the side of the containers which faces the conveyor belt are arranged at least substantially in a V shape with respect to one another, at least in some section or sections.

12. The method according to claim 10, wherein in the central region of the container path, and/or in a rearward region of the container path, the selected conveying speed of the containers along the container path is at least substantially the same as the conveying speed of the conveying surface of the conveyor belt.

13. The method according to claim 10,
    wherein, in the central region of the container path, the conveying surface of the conveyor belt and the side of the containers which faces the conveyor belt are arranged horizontally with respect to one another, at least in some section or sections, and/or wherein, in the central region of the container path, the conveying surface of the conveyor belt and the side of the containers which faces the conveyor belt are arranged at least substantially in a V shape with respect to one another, at least in some section or sections.

14. The method according to claim 10, wherein in the central region of the container path, and/or in a rearward region of the container path, the selected conveying speed and/or conveying direction of the containers along the container path are/is different from the conveying speed of the conveying surface of the conveyor belt.

15. The method according to claim 1, wherein the method further comprises unloading the packages via the side of the container which faces the conveying surface of the conveyor belt and/or via the top of the container, and/or wherein the conveying surface of the conveyor belt extends horizontally, at least in some section or sections, in the central region of the container path.

16. The method according to claim 1, further comprising turning the containers at least substantially upside down, and/or raising the containers relative to the conveying surface of the conveyor belt, and/or lowering the conveying surface of the conveyor belt relative to the containers.

17. The method according to claim 1, further comprising tilting the unloaded containers as required in a direction opposite to that of a central region of the container path, sideways to the container path.

18. The method according to claim 17, wherein the unloaded containers are righted again and/or wherein the sides of the containers which previously faced the conveyor belt are arranged at least substantially vertically.

19. The method according to claim 1, wherein during the entire movement of the containers along the entire container path by the container guide, the containers are moved continuously along the container path.

20. The method according to claim 1, further comprising:

pivoting the containers about an axis at least substantially parallel to the container path during the tipping and/or during the righting process, and/or pivoting the containers to the side at an at least substantially constant angular speed during the tipping and/or during the righting process.

21. The method according to claim 1, wherein during the entire movement of the containers along the entire container path by the container guide, the method further comprises supporting the containers against an unloading wall, between the container path and the conveyor belt, said unloading wall defining the tilt of the containers.

22. The method according to claim 1, wherein, in the region of the tipping of the containers, in the region of the unloading of the packages, and/or in the region of the righting of the containers, the conveyor belt is at different heights in relation to the containers, the conveyor belt being moved upward and/or downward in synchronism with the tipping and/or righting, and/or in synchronism with the guideway and/or with the at least one rail.

23. The method according to claim 22, further comprising moving the conveyor belt upward and/or downward in such a way that the unloading level of the packages during the unloading of the packages is at least substantially constant less than 0.6 m.

24. The method according to claim 23, wherein the unloading level of the packages during the unloading of the packages is at least substantially constant less than 0.5 m.

25. The method according to claim 24, wherein the unloading level of the packages during the unloading of the packages is at least substantially constant less than 0.4 m.

26. The method according to claim 1, wherein, in a forward region of the container path, the conveying surface of the conveyor belt and the side of the containers which faces the conveyor belt are arranged vertically with respect to one another, at least in some section or sections, wherein, in a central region of the container path, the containers and the conveyor belt are tilted jointly to the side relative to the container path and in the same direction, in comparison with the forward region of the container path.

27. The method according to claim 1, wherein, during the tipping of the containers, during the unloading of the packages, and/or during the righting of the containers, the method further comprises moving the containers in a different direction and/or at a different speed along a container path to the region of the conveyor belt which is arranged to the side of the containers.

28. The method of claim 27, wherein the step of moving the containers comprises moving the containers in an opposite direction.

* * * * *